Dec. 23, 1958   J. ROBELL ET AL   2,865,714
PRODUCTION OF ANHYDROUS HYDRAZINE
Filed Aug. 2, 1954
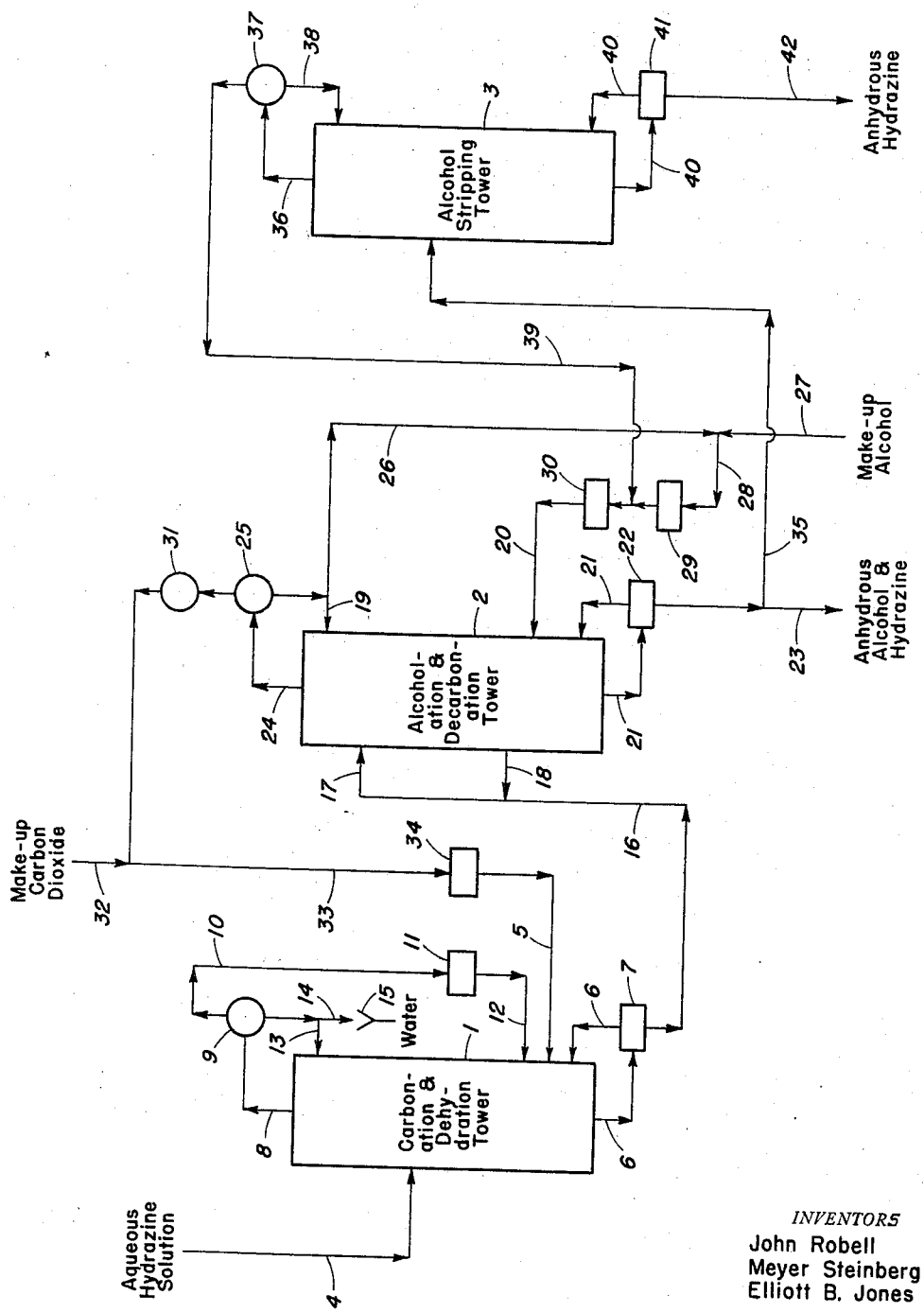
INVENTORS
John Robell
Meyer Steinberg
Elliott B. Jones
BY Charles J. Elderkin
ATTORNEY

United States Patent Office 2,865,714
Patented Dec. 23, 1958

2,865,714

PRODUCTION OF ANHYDROUS HYDRAZINE

John Robell, West Hempstead, Meyer Steinberg, Long Island City, and Elliott B. Jones, Levittown, N. Y., assignors to Guggenheim Brothers (1949 Firm), a co-partnership Application August 2, 1954, Serial No. 447,024

18 Claims. (Cl. 23—190)

This invention relates to the production of anhydrous hydrazine and has for an object the provision of an improved process for producing anhydrous hydrazine and the provision of new and useful products comprising anhydrous hydrazine.

As manufactured in commercial operations, hydrazine is obtained, initially, in the form of dilute aqueous solutions. For example, in the commercial Raschig type process, hydrazine is obtained, initially, in the form of a solution consisting essentially of water and hydrazine in which hydrazine is present in an amount by weight equal to about one percent (1.0%) to two percent (2.0%) of the weight of the solution. Hydrazine is a valuable industrial compound having a large field of utility, but, in such a state of dilution, its usefulness is limited. Consequently, the dilute solutions produced, initially, customarily are subjected to concentration treatments to produce aqueous solutions containing hydrazine in greater and more suitable concentrations, or to produce a more useful and more valuable product such as anhydrous, or substantially anhydrous, hydrazine.

Concentration of dilute solutions of hydrazine can be accomplished effectively and relatively economically through the use of fractional distillation methods to produce aqueous solutions consisting essentially of water and hydrazine in which hydrazine may be present in amounts by weight equal to about fifty percent (50%) to sixty-six percent (66%) of the weights of the concentrated solutions, the hydrazine being present largely or substantially entirely in the form of hydrazine hydrate ($N_2H_4.H_2O$) in which hydrazine constitutes sixty-four percent (64%) of the weight of the hydrate.

Owing to the fact that hydrazine and water ultimately form an azeotropic or constant boiling mixture as the concentration of hydrazine relatively to the concentration of water increases, it is impossible to produce anhydrous, or substantially anhydrous, hydrazine through the use of fractional distillation methods.

A number of processes and procedures for separating hydrazine from water contained in the azeotropic or constant boiling mixtures and producing and recovering anhydrous hydrazine have been proposed and employed heretofore. Some of such processes and procedures utilize (1) the principle involving precipitation of relatively insoluble hydrazine sulphate, followed by decomposition of the sulphate by means of either anhydrous liquid ammonia as such or a solution of anhydrous ammonia in a non-aqueous liquid in which both ammonia and hydrazine are soluble and in which ammonium sulphate formed during the course of the process is insoluble, separation of the solution from the solid ammonium sulphate, and fractional distillation of the solution; (2) the principle involving selective addition to the water-hydrazine azeotropic mixture of a reagent capable of forming with water a lower-boiling point azeotrope, followed by fractional distillation to remove the lower-boiling point azeotrope thus formed, and subsequent fractional distillation of the residual hydrazine-containing liquid; and (3) the principle involving partitioning through the addition to the water-hydrazine azeotrope of a reagent capable of developing a system consisting of two immiscible liquids one of which is capable of dissolving and retaining water to a greater extent than is the water-hydrazine azetrope, followed by separation and fractional distillation of the hydrazine-rich liquid.

Processes of the above-described types can be employed to produce anhydrous hydrazine, but some objectionable and disadvantageous features are inherent in each. Thus, for example, in the process involving the precipitation and treatment with ammonia of hydrazine sulphate, the necessary liquid-slurry separations are difficult and expensive to carry out, appreciable losses of hydrazine are unavoidable, and the disposal or utilization of the ammonium sulphate by-product creates a costly problem. In the process involving the formation of a lower-boiling point azetotrope, many control features and factors are highly critical, and slight deviations from design conditions prevent proper separation and recovery of anhydrous hydrazine. Furthermore, all of the anhydrous hydrazine produced must be handled in the vapor state, and, in some portions of the essential apparatus, part of the hydrazine must be handled at temperatures as high as 80° C. above the normal boiling temperature of hydrazine. The handling of large volumes of concentrated hydrazine vapor at high temperatures is extremely dangerous, and the constant presence of hydrazine vapor at high temperatures constitutes a continuing and ever-present explosion hazard. In the process employing the partitioning principle, also, large volumes of hydrazine vapor must be handled at temperatures several degrees higher than the normal boiling temperature of hydrazine, so dangerous conditions are established and an explosion hazard is created.

The present invention is based on our discovery that compounds which are complexes of hydrazine and carbon dioxide such, for example, as carbazic acid ($HCO_2N_2H_3$) and hydrazinium carbazate ($N_2H_5CO_2N_2H_3$), can be employed effectively, advantageously (both from operational and economy standpoints), and without danger, to produce anhydrous hydrazine and to produce compositions of which hydrazine is a component. We have discovered that when a mixture comprising hydrazinium carbazate or carbazic acid, or both, and an organic liquid in which hydrazinium carbazate and carbazic acid are insoluble but which is capable of dissolving hydrazine (a solvent for hydrazine) is heated, hydrazinium carbazate and carbazic acid decompose to form gaseous carbon dioxide, which is eliminated, and anhydrous hydrazine which dissolves in the solvent, forming a solution of hydrazine.

Compounds comprising hydrazine and carbon dioxide may be obtained from any suitable source or sources for use in producing anhydrous hydrazine in accordance with the invention. Compounds such as hydrazinium carbazate and carbazic acid may be obtained by subjecting aqueous hydrazine to a carbonation treatment to produce an aqueous solution of hydrazinium carbonate ($N_2H_5)_2CO_3$ and subjecting the solution to a dehydration treatment under a carbon dioxide atmosphere to effect vaporization of all water present in the solution with the production of anhydrous hydrazinium carbazate or anhydrous carbazic acid or both. In employing aqueous hydrazine as the raw material, hydrazinium carbazate can be produced with greater facility than can carbazic acid. Therefore, in carrying out a process of our invention for recovering anhydrous hydrazine from aqueous hydrazine, we prefer to so control our process operations as to form a product consisting largely or entirely of anhydrous hydrazinium carbazate. In the production of the hydrazinium carbazate product, some carbazic acid may be formed, and, if some carbazic acid is formed, the resulting product will be a mixture comprising a relatively large proportion of hydrazinium carbazate and a relatively small proportion of carbazic acid. The presence of carbazic acid in the product is not objectionable, for it can be decomposed with elimination of its carbon dioxide content and the recovery of its hydrazine content under the conditions employed in effecting decomposition of hydrazinium carbazate to effect elimination of its carbon dioxide content and recovery of its hydrazine content. Accordingly, for purposes of clarity in describing a process of our invention designed to form an anhydrous product that is largely hydrazinium carbazate, we shall disregard carbazic acid when present and refer to the product simply as hydrazinium carbazate.

We have found that alcohols are effective organic solvents and reagents for use in carrying out a process of our invention. We have employed successfully both monohydric and polyhydric alcohols. For reasons that we shall set forth, we prefer to employ aliphatic alcohols, either saturated or unsaturated, in carrying out processes in accordance with our invention.

Alcohols that we have employed effectively include methyl alcohol, ethyl alcohol, n-propyl alcohol, isopropyl alcohol, n-butyl alcohol, isobutyl alcohol, allyl alcohol, ethylene glycol, and glycerol.

In carrying out a process of our invention involving the use of an alcohol as the hydrazine solvent, we heat a mixture comprising alcohol and hydrazinium carbazate or carbazic acid, or both, to a temperature at which decomposition of at least one of the compounds commences, and we increase the temperature as the operation proceeds, if necessary, to effect elimination of all carbon dioxide contained in the mixture and vaporization of some alcohol other than the amount that is required for dissolving and retaining in solution liberated hydrazine. Hydrazinium carbazate is a liquid at the temperatures above ordinary room temperature employed in carrying out a process of our invention. Anhydrous hydrazinium carbazate products which contain carbazic acid, also, are liquid at the temperatures above ordinary room temperature employed in carrying out a process of our invention. Since hydrazinium carbazate and carbazic acid are insoluble in alcohol, two liquid phases exist during the course of a process of the invention as long as any significant quantity of hydrazinium carbazate is present. We have discovered that all proportions of alcohol and hydrazinium carbazate will dissolve hydrazine and liberate carbon dioxide.

According to our experience, hydrazinium carbazate can be handled with greater saftey than can most other hydrazine compounds. We have handled hydrazinium carbazate with complete safety and confidence when heated to temperatures as high as about 170° C.

At the conclusion of a step of our process involving heating of a mixture of alcohol and hydrazinium carbazate, if two liquid phases remain, they are permitted to separate and form two separable layers, and the supernatant or top layer, consisting essentially of hydrazine and alcohol, is separated from the bottom layer, consisting essentially of hydrazinium carbazate, by decantation. The unreacted or undecomposed hydrazinium carbazate is retained for further heat treatment in the presence of alcohol. The solution consisting essentially of alcohol and hydrazine is subjected to fractional distillation to obtain two fractions, one consisting essentially of anhydrous hydrazine and one consisting essentially of alcohol.

The hydrazine will be vaporized and recovered as a distillate, or, it will be retained as a residue in the distillation apparatus, depending upon the relative boiling points of hydrazine and the alcohol employed.

In accordance with a preferred process of our invention, we employ an alcohol having a boiling point lower than the boiling point of hydrazine when we seek to produce anhydrous hydrazine in order that vaporization of hydrazine may be avoided in the step of separating hydrazine and alcohol contained in the alcohol-hydrazine solution resulting from the heating of hydrazinium carbazate with alcohol. Thus, we are able to eliminate or avoid the development of various dangerous conditions including, among others, toxic conditions and explosion hazards.

In employing low-boiling point alcohols, such as methyl alcohol (methanol) and ethyl alcohol (ethanol) and employing as a starting material aqueous hydrazine containing 54.4 percent of hydrazine, by weight, from which we produced hydrazinium carbazate, we have made substantially complete recoveries of the hydrazine in the form of anhydrous hydrazine products containing not less than 98 percent, by weight of hydrazine.

If warranted by any particular conditions or circumstances, we may employ alcohols having boiling points higher than the boiling point of hydrazine in the recovery of anhydrous hydrazine by vaporization and condensation of hydrazine. Results comparable with those obtained with the relatively low-boiling point alcohols may be obtained when relatively high-boiling point alcohols are employed. As hereinbefore suggested, however, it usually is advisable to avoid the use of the relatively high-boiling point alcohols requiring vaporization of hydrazine because of hazards that may be involved.

The invention provides a simple, effective and relatively inexpensive process for producing highly useful, water-free compositions comprising hydrazine and alcohol in any suitable proportions in a novel manner. Such compositions may be obtained through the use of alcohols having boiling points both lower and higher than the boiling point of hydrazine. Polyhydric alcohols may be employed advantageously in forming such compositions. Polyhydric alcohols such, for example, as ethylene glycol and glycerol, liberate carbon dioxide from hydrazinium carbazate very readily. The hydrazine present in such a mixture or solution is available for use as a reagent, and both the hydrazine and the alcohol are available to function in combination as fuel.

A complete preferred process of our invention includes three major steps, namely, (1) a carbonation and dehydration step, (2) an alcoholation and decarbonation step and (3) an alcohol stripping (or fractional distillation) step. Such a process is illustrated in the accompanying single flow-sheet drawing, together with essential or desirable auxiliary steps or operations.

In carrying out a preferred complete process of our invention, we employ as the starting raw material aqueous hydrazine in either the liquid state or the gaseous state. The aqueous hydrazine we employ may be a dilute aqueous solution similar to that produced initially in carrying out a Raschig type process; it may be a more concentrated solution obtained through fractional distillation of such a dilute solution; it may be a relatively low-quality (with respect to hydrazine content) product formed in carrying out a heretofore customary type of process intended for the production of anhydrous hydrazine; or it may be of any concentration at or below the azeotropic concentration. The process of the invention can be utilized for completing the production of anhydrous hydrazine from any point of concentration at or above the azeotropic concentration reached by any other process.

In carrying out a preferred complete process of the invention involving three major stages or steps, aqueous hydrazine is subjected to a carbonation and dehydration treatment in which gaseous carbon dioxide is bubbled through the solution to produce an aqueous solution of hydrazinium carbonate by means of a reaction which may be indicated generally by the equation, $$2N_2H_4(aq.) + H_2O + CO_2(g.) = (N_2H_5)_2CO_3(aq.)$$
Hydrazinium
carbonate and the aqueous solution of hydrazinium carbonate thus produced is heated under a carbon dioxide atmosphere to effect vaporization of all of the water present in the solution and the production of anhydrous or water-free hydrazinium carbazate by means of a reaction which may be indicated generally by the equation,

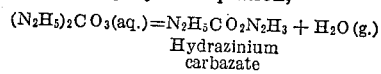
$$(N_2H_5)_2CO_3(aq.) = N_2H_5CO_2N_2H_3 + H_2O(g.)$$
Hydrazinium carbazate In the second stage or step of the process, a mixture consisting essentially of a low-boiling point alcohol, such as methanol or ethanol, and the hydrazinium carbazate produced in the first stage (which is insoluble in alcohol) is heated to a temperature sufficiently high to effect decomposition with the production of carbon dioxide and hydrazine. Decomposition of the hydrazinium carbazate with liberation of gaseous carbon dioxide begins at temperatures below the boiling point of the mixture and continues at higher temperatures up to the boiling point of the mixture. Carbon dioxide is removed during this operation with the production of anhydrous hydrazine which dissolves in the alcohol. The reaction involved may be represented generally by the following equation:

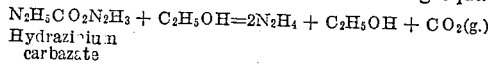
$$N_2H_5CO_2N_2H_3 + C_2H_5OH = 2N_2H_4 + C_2H_5OH + CO_2(g.)$$
Hydrazinium carbazate In the third stage or step of the process, the alcohol solution of hydrazine is heated to a temperature sufficiently high and under such conditions that all of the alcohol contained in the solution is vaporized and a residue consisting essentially of anhydrous hydrazine is produced.

As illustrated in schematic form in the flow diagram of the drawing, apparatus suitable for use in carrying out a preferred complete process of our invention may comprise a carbonation and dehydration tower 1, an alcoholation and decarbonation tower 2, and an alcohol stripping tower 3, in which the three major steps of the process are carried out, together with various auxiliary equipment associated with each of the towers, as identified hereinafter with reference to the detailed description of our process taken in conjunction with the drawing. All units of the apparatus employed in effecting a process of the invention are of standard construction, and each is formed of suitable materials known to be capable of resisting corrosion satisfactorily under its conditions of use.

In employing apparatus of the type indicated in the flow diagram, aqueous hydrazine from any suitable source of supply is introduced (4) into the carbonation and dehydration tower 1 near the middle thereof, as indicated on the drawing, for downward flow therethrough in contact with and in counter-current flow with respect to a bubbling stream of gaseous carbon dioxide introduced (5) near the bottom of the tower. The aqueous hydrazine, in passing downwardly through tower 1 in contact with upwardly flowing gaseous carbon dioxide, is converted to hydrazinium carbonate which dissolves in the water associated with the aqueous hydrazine to form a solution and flows downwardly, in solution, into the lower portion of the tower, wherein heat, supplied indirectly by means of circulating (6) liquid hydrazinium carbazate heated to a suitable temperature in reboiler 7 associated with tower 1, effects conversion of the hydrazinium carbonate to hydrazinium carbazate and vaporization of all excess water with the production of substantially water-free (or anhydrous) hydrazinium carbazate.

The interior of the lower portion of the carbonation and dehydration tower 1 is maintained at a temperature such that the hydrazinium carbazate produced therein is a fluid liquid. Pure hydrazinium carbazate is a solid at normal room temperature and has a melting point of 70° C. When impurities are present, hydrazinium carbazate may be a fluid liquid at temperatures substantially lower than 70° C.

Means are provided in tower 1 for withdrawing (8) excess carbon dioxide and the water vapor produced from the upper portion of the carbonation and dehydration tower, from whence it is passed to a condenser 9 for separation of carbon dioxide and water. The carbon dioxide thus recovered is passed (10) through a carbon dioxide heater 11 and recycled (12) to tower 1. Water from condenser 9 may be passed (13) to tower 1 and utilized in appropriate amounts and at appropriate times for reflux purposes, or passed (14) to waste through a suitable drain 15.

Hydrazinium carbazate is taken (16) from reboiler 7 and passed (17) to the interior of the upper part of the middle portion of the alcoholation and decarbonation tower 2, in admixture with unreacted or undecomposed hydrazinium carbazate recycled (18) from the lower portion of tower 2. The hydrazinium carbazate is mixed in tower 2 with reflux alcohol which, as illustrated on the flow sheet, is introduced (19) into the upper portion of the tower. The mixture of hydrazinium carbazate and alcohol flows downwardly through tower 2, wherein, under the influence of direct heating through contact with an ascending stream (20) of super-heated alcohol vapor and, if necessary, indirect heating by means of circulating (21) alcohol vapor produced in a reboiler 22 associated with tower 2, the hydrazinium carbazate is decomposed with the release of gaseous carbon dioxide and liquid anhydrous hydrazine. The liquid anhydrous hydrazine dissolves in the alcohol present in the tower, forming a water-free (or anhydrous) solution (23) consisting essentially of hydrazine and alcohol.

Means are provided for collecting unreacted or undecomposed hydrazinium carbazate from the lower part of the middle portion of alcoholation and decarbonation tower 2 for return to the upper part of the middle portion of the tower for admixture (18) with the hydrazinium carbazate passed (16) from reboiler 7, as explained hereinbefore. Means are provided, also, for collecting a mixture of released carbon dioxide and alcohol vapor from the upper portion of the tower which is passed (24) to a condenser 25 to condense the alcohol to the liquid state and separate dry gaseous carbon dioxide. A portion of the liquid alcohol is passed (19) to the upper portion of the alcoholation and decarbonation tower 2, and the remainder is passed (26) for admixture, as required, with additional alcohol from a supply (27) of make-up alcohol, and thence (28) to an alcohol vaporizer 29 and alcohol vapor heater 30 for vaporizing and super-heating the alcohol for return (20) to the bottom portion of tower 2. The gaseous carbon dioxide separated from the alcohol in condenser 25 is passed to a low temperature condenser 31, supplemented, as required, with a supply (32) of make-up carbon dioxide, and then passed (33) to a carbon dioxide heater 34 to provide the stream of carbon dioxide which is introduced (5) at the bottom of the carbonation and dehydration tower 1.

The liquid solution consisting essentially of hydrazine and alcohol produced in tower 2 is conducted (35) to the alcohol stripping tower 3, wherein it is heated under controlled conditions to effect the vaporization of all alcohol contained in the solution with the production of a residue consisting essentially of anhydrous hydrazine. Means are provided for collecting (36) alcohol vapor from the upper portion of the tower which is condensed, in part, to the liquid state in condenser 37, and the liquid alcohol is passed (38) in the form of a reflux stream to the upper portion of tower 3. The remaining alcohol vapor is passed (39) in the gaseous state to the alcohol vapor heater 30, associated with the alcoholation and decarbonation tower 2, for heating and re-use in tower 2. A portion or all of the heat required for vaporizing the alcohol contained in the alcohol solution of hydrazine may be provided by circulating (40) anhydrous hydrazine heated in a reboiler 41 associated with tower 3 through the lower portion of the tower.

Anhydrous hydrazine produced in the alcohol stripping tower 3, is withdrawn (42) from the bottom portion of the tower for use, storage or marketing.

Any suitable type of apparatus may be employed in carrying out any single step or any combination of steps of a process of our invention, and any suitable temperatures and pressures may be employed. We prefer to carry out the various steps of our process under essentially atmospheric pressure because the nature of the process is such that it can be carried out at approximately atmospheric pressure with substantial advantages with respect to recoveries, quality of product, simplicity and cost of apparatus and, cost of reagents and operational control.

The following tabulation shows temperatures and temperature ranges that may be employed advantageously in carrying out a preferred complete process of our invention at a pressure of one atmosphere, employing apparatus of the type indicated in the flow-sheet of the drawing and using methyl alcohol (methanol) and ethyl alcohol (ethanol), respectively, in two operations:

CARBONATION AND DEHYDRATION TOWER

*Temperatures*

| Top of Tower, °C. | Bottom of Tower, °C. |
| --- | --- |
| 90 to 100 | 70 to 140 |

ALCOHOLATION AND DEHYDRATION TOWER

*Temperatures*

METHANOL OPERATION

| Hydrazinium Carbazate Feed, °C. | Top of Tower, °C. | Bottom of Tower, °C. |
| --- | --- | --- |
| 70 to 140 | <64.5 | 64.5 to 80 |

ETHANOL OPERATION

| 70 to 140 | <78.3 | 78.3 to 90 |
| --- | --- | --- |

ALCOHOL STRIPPING TOWER

*Temperatures*

METHANOL OPERATION

| Top of Tower, °C. | Bottom of Tower, °C. |
| --- | --- |
| 64.5 | 113.5 |

ETHANOL OPERATION

| 78.3 | 113.5 |
| --- | --- |

For purposes of illustration, we have described a carbonation and dehydration step of our process in which gaseous carbon dioxide is employed as the carbonating agent. We may employ, as a carbonating agent, a salt or other compound containing carbon dioxide in chemical combination. A carbonate of ammonium, for example, may be employed advantageously.

The following examples illustrate procedures followed and results obtained in carrying out processes of our invention:

EXAMPLE 1

An aqueous solution of hydrazine containing 54.4% by weight of hydrazine was carbonated with gaseous carbon dioxide and distilled at atmospheric pressure under a carbon dioxide atmosphere, with the aid of a reflux condenser, at temperatures up to 140° C. The residue was analyzed and found to contain substantially pure anhydrous hydrazinium carbazate. Methyl alcohol was added to the residue in the proportion of 6.5 moles of alcohol to 1 mole of hydrazine contained in the hydrazinium carbazate. The resulting mixture, consisting of two immiscible liquid layers, was heated at atmospheric pressure, with the aid of a reflux condenser, at temperatures up to 66° C. Carbon dioxide was evolved and hydrazine was liberated, and the liberated hydrazine dissolved in the alcohol layer. The operation was continued until substantially all the carbon dioxide present in the hydrazinium carbazate layer was eliminated and only one liquid layer consisting essentially of hydrazine and alcohol remained. Alcohol was then removed by distillation at atmospheric pressure, with the aid of a reflux condenser, until a temperature of 114° C. was reached in the still. The residue analyzed 96.3% of hydrazine by weight.

EXAMPLE 2

An aqueous solution of hydrazine containing 54.4% by weight of hydrazine was carbonated with gaseous carbon dioxide and distilled at atmospheric pressure under a carbon dioxide atmosphere, with the aid of a reflux condenser, at temperatures up to 140° C. The residue was analyzed and found to contain substantially pure anhydrous hydrazinium carbazate. Ethyl alcohol was added to the residue in the proportion of 2 moles of alcohol to 1 mole of hydrazine contained in the hydrazinium carbazate. The resulting mixture, consisting of two immiscible liquid layers, was heated at atmospheric pressure, with the aid of a reflux condenser, at temperatures up to 82° C. Carbon dioxide was evolved and hydrazine was liberated, and the liberated hydrazine dissolved in the alcohol layer. The operation was continued until 44% of the hydrazine contained in the hydrazinium carbazate was liberated with evolution of carbon dioxide equivalent to the liberated hydrazine. At this point the upper layer, containing hydrazine and ethyl alcohol, was decanted, and the alcohol was removed by distillation under atmospheric pressure, with the aid of a reflux condenser, until a temperature of 118° C. was reached in the still. The residue analyzed 94.8% of hydrazine by weight.

EXAMPLE 3

An aqueous solution of hydrazine containing 54.4% by weight of hydrazine was carbonated with gaseous carbon dioxide and distilled at atmospheric pressure under a carbon dioxide atmosphere, with the aid of a reflux condenser, at temperatures up to 140° C. The residue was distilled at 140° C. and the distillate was analyzed and found to contain substantially pure hydrazinium carbazate. Methyl alcohol was added to the distillate in the proportion of 4 moles of alcohol to 1 mole of hydrazine contained in the hydrazinium carbazate. The resulting mixture, consisting of two immiscible liquid layers, was heated at atmospheric pressure, with the aid of a reflux condenser, at temperatures up to 66° C. Carbon dioxide was evolved and hydrazine was liberated, and the liberated hydrazine dissolved in the alcohol layer. The operation was continued until substantially all of the carbon dioxide present in the hydrazinium carbazate layer was eliminated and only one liquid layer remained. Alcohol was then removed by distillation at atmospheric pressure, with the aid of a reflux condenser. The residue was further distilled until a temperature of 117.5° C. was reached in the still. The distillate analyzed 98.5% of hydrazine by weight.

We claim:

1. In a process for producing anhydrous hydrazine in which a hydrazine-containing compound is thermally decomposed within an anhydrous alcoholic solvent for the separation and recovery of an anhydrous solution of hydrazine, the improvement that comprises employing as the hydrazine-containing compound a complex of hydrazine and carbon dioxide selected from the group consisting of carbazic acid, hydrazinium carbazate, and mixtures thereof.

2. In a process for producing anhydrous hydrazine, the step that comprises heating a mixture of an anhydrous alcohol and an anhydrous binary complex of hydrazine and carbon dioxide selected from the group consisting of carbazic acid, hydrazinium carbazate and mixtures thereof, to effect thermal decomposition of the complex with the production and elimination of carbon dioxide in the gaseous state, the production of anhydrous hydrazine, and the formation of an anhydrous alcoholic solution of said hydrazine.

3. In a process for producing anhydrous hydrazine, the step which comprises heating a mixture comprising hydrazinium carbazate and a monohydric alcohol to effect decomposition of the hydrazinium carbazate with the production and elimination of carbon dioxide in the gaseous state, the production of anhydrous hydrazine and the formation of a solution comprising the anhydrous hydrazine thus produced and alcohol present in the original mixture.

4. In a process for producing anhydrous hydrazine, the step which comprises heating a mixture comprising hydrazinium carbazate and a polyhydric alcohol to effect decomposition of the hydrazinium carbazate with the production and elimination of carbon dioxide in the gaseous state, the production of anhydrous hydrazine and the formation of a solution comprising the anhydrous hydrazine thus produced and alcohol present in the original mixture.

5. In a process for producing anhydrous hydrazine, the step which comprises heating a mixture comprising hydrazinium carbazate and an aliphatic alcohol to effect decomposition of the hydrazinium carbazate with the production and elimination of carbon dioxide in the gaseous state, the production of anhydrous hydrazine and the formation of a solution comprising the anhydrous hydrazine thus produced and alcohol present in the original mixture.

6. A process for producing anhydrous hydrazine which comprises subjecting aqueous hydrazine to carbonation and vaporization treatments to produce hydrazinium carbazate and to produce and vaporize water, and heating a mixture comprising the hydrazinium carbazate and an anhydrous solvent for hydrazine to effect decomposition of the hydrazinium carbazate with the production and elimination of carbon dioxide in the gaseous state, the production of anhydrous hydrazine and the formation of a solution comprising the anhydrous hydrazine thus produced and the solvent present in the original mixture.

7. A process for producing anhydrous hydrazine which comprises subjecting aqueous hydrazine to carbonation and vaporization treatments to produce hydrazinium carbazate and to produce and vaporize water, and heating a mixture comprising the hydrazinium carbazate and an alcohol to effect decomposition of the hydrazinium carbazate with the production and elimination of carbon dioxide in the gaseous state, the production of anhydrous hydrazine and the formation of a solution comprising the anhydrous hydrazine thus produced and alcohol present in the original mixture.

8. A process for producing anhydrous hydrazine which comprises subjecting aqueous hydrazine to carbonation and vaporization treatments to produce hydrazinium carbazate and to produce and vaporize water, and heating a mixture comprising the hydrazinium carbazate and a monohydric alcohol to effect decomposition of the hydrazinium carbazate with the production and elimination of carbon dioxide in the gaseous state, the production of anhydrous hydrazine and the formation of a solution comprising the anhydrous hydrazine thus produced and alcohol present in the original mixture.

9. A process for producing anhydrous hydrazine which comprises subjecting aqueous hydrazine to carbonation and vaporization treatments to produce hydrazinium carbazate and to produce and vaporize water, and heating a mixture comprising the hydrazinium carbazate and an aliphatic alcohol to effect decomposition of the hydrazinium carbazate with the production and elimination of carbon dioxide in the gaseous state, the production of anhydrous hydrazine and the formation of a solution comprising the anhydrous hydrazine and alcohol present in the original mixture.

10. The process for producing anhydrous hydrazine which comprises subjecting aqueous hydrazine to carbonation and vaporization treatments to produce hydrazinium carbazate and water and to vaporize the water, heating a mixture comprising the hydrazinium carbazate and an anhydrous solvent for hydrazine to effect decomposition of the hydrazinium carbazate with the production and elimination of carbon dioxide in the gaseous state, the production of anhydrous hydrazine and the formation of a solution comprising the anhydrous hydrazine thus produced and the solvent present in the original mixture.

11. The process for producing anhydrous hydrazine which comprises subjecting aqueous hydrazine to carbonation and vaporization treatments to produce hydrazinium carbazate and water and to vaporize the water, heating a mixture comprising the hydrazinium carbazate and an alcohol having a boiling point lower than the boiling point of hydrazine to effect decomposition of the hydrazinium carbazate with the production and elimination of carbon dioxide in the gaseous state, the production of anhydrous hydrazine and the formation of a solution comprising the anhydrous hydrazine and the alcohol present in the original mixture, and heating the solution comprising anhydrous hydrazine and alcohol to vaporize the alcohol and recover as a residue a product consisting essentially of anhydrous hydrazine.

12. The process for producing anhydrous hydrazine which comprises subjecting aqueous hydrazine to carbonation and vaporization treatments to produce hydrazinium carbazate and water and to vaporize the water, heating a mixture comprising the hydrazinium carbazate and a monohydric alcohol having a boiling point lower than the boiling point of hydrazine to effect decomposition of the hydrazinium carbazate with the production and elimination of carbon dioxide in the gaseous state, the production of anhydrous hydrazine and the formation of a solution comprising the anhydrous hydrazine and the alcohol present in the original mixture, and heating the solution comprising anhydrous hydrazine and alcohol to vaporize the alcohol and recover as a residue a product consisting essentially of anhydrous hydrazine.

13. The process for producing anhydrous hydrazine which comprises subjecting aqueous hydrazine to carbonation and vaporization treatments to produce hydrazinium carbazate and water and to vaporize the water, heating a mixture comprising the hydrazinium carbazate and an alcohol having a boiling point higher than the boiling point of hydrazine to effect decomposition of the hydrazinium carbazate with the production and elimination of carbon dioxide in the gaseous state, the production of anhydrous hydrazine and the formation of a solution comprising the anhydrous hydrazine and the alcohol present in the original mixture, heating the solution comprising anhydrous hydrazine and alcohol to vaporize the hydrazine, and collecting and condensing the vaporized hydrazine.

14. The process for producing anhydrous hydrazine which comprises subjecting aqueous hydrazine to carbonation and vaporization treatments to produce hydrazinium carbazate and water and to vaporize the water, heating a mixture comprising the hydrazinium carbazate and a solvent for hydrazine comprising an alcohol of the group consisting of methyl alcohol, ethyl alcohol, n-propyl alcohol, isopropyl alcohol, n-butyl alcohol, isobutyl alcohol, allyl alcohol, ethylene glycol and glycerol to effect decomposition of the hydrazinium carbazate with the production and elimination of carbon dioxide in the gaseous state, the production of anhydrous hydrazine and the formation of a solution comprising the anhydrous hydrazine thus produced and the solvent present in the original mixture.

15. A process for producing a solution comprising anhydrous hydrazine and alcohol which comprises heating a mixture comprising hydrazinium carbazate and an alcohol to effect decomposition of the hydrazinium carbazate with the production and elimination of carbon dioxide in the gaseous state, the production of anhydrous hydrazine and the formation of a solution comprising the anhydrous hydrazine thus produced and alcohol present in the original mixture.

16. In a process for producing anhydrous hydrazine in which a hydrazine-containing compound is thermally decomposed within an anhydrous alcoholic solvent for the separation and recovery of an anhydrous solution of hydrazine, the improvement that comprises employing hydrazinium carbazate as the hydrazine-containing compound.

17. In a process for producing anhydrous hydrazine in which a hydrazine-containing compound is thermally decomposed within an anhydrous alcoholic solvent for the separation and recovery of an anhydrous solution of hydrazine, the improvement that comprises employing carbazic acid as the hydrazine-containing compound.

18. In a process for producing anhydrous hydrazine in which a hydrazine-containing compound is thermally decomposed within an anhydrous alcoholic solvent for the separation and recovery of an anhydrous solution of hydrazine, the improvement that comprises employing as the hydrazine-containing compound a mixture comprising a relatively large proportion of hydrazinium carbazate and a relatively small proportion of carbazic acid.

References Cited in the file of this patent

FOREIGN PATENTS 47,600     Germany     May 28, 1889

OTHER REFERENCES

"The Chem. of Hydrazine," by L. F. Audrieth and B. A. Ogg, 1951 ed., page 214, John Wiley & Sons, Inc., N. Y.

J. W. Mellor's "A Comprehensive Treatise on Inorganic and Theoretical Chem.," vol. 8, 1928 ed., page 327, Longmans, Green and Co., N. Y.

Chem. Abstracts, vol. 46, No. 5, page 1905.